fere with the motion of the induction-valves, the lines U and V representing the limits between which the tappet E travels and the lines S and T representing the limits between which the tappet F travels.

Fig. VI is a side and horizontal view of the tappets E and F. Fig. VII shows the piece G that holds the screw H.

D is a link communicating to the rock-shaft A the motion of the rock-shaft $f$.

E and F are the additional tappets attached to the rock-shaft A.

G is a piece attached to the shaft A for the purpose of holding the screw H.

H is a screw on one half of which a right-handed thread is cut and on the other half a left-handed thread.

I and K are nuts on the screw H, the nut I working on the left-hand thread of the screw and K on the right-hand thread.

L and M are projections on the tappets E and F, that the nuts I and K work against, and thus elevate and depress the tappets on the shaft A. N is the handle for turning the screw H. O and P are hinge-pieces attached to the additional feet Q and R, that lift the induction-valve lifting-rods.

The operation is as follows: The rock-shaft A has, by means of the link D, identically the same motion that the rock-shaft $f$ has, and consequently when the tappets E and F are, by means of the screw H and nuts I and K, spread out to the utmost, as shown in Fig. IV, then these tappets E and F have identically the same motion that the exhaust-tappets $n$ and $o$ have, and thus communicate to the induction-valves the motion of the eduction-valves and keep them up until the end or nearly the end of the stroke. Now, when the screw H is turned by the handle N in the proper direction, the nuts I and K will approach each other, and the tappets E and F will also by the action of their own weight approach each other, the projection L of the tappet E pressing on the nut I and the projection M of the tappet F pressing on the nut K, so that when they are in the position shown at Fig. V neither tappet will raise either induction-valve and the steam will be cut off at the point at which Stevens's cut-off is set. It is evident that when the screw H is turned so that the nuts I and K have an intermediate position between those shown at Fig. IV and Fig. V then the steam will be cut off at some point intermediate between that at which Stevens's cut-off is set and the full stroke of the piston.

What I claim is—

1. Adding to Stevens's cut-off the shaft A and tappets E and F, the lifters Q and R, and the hinge-pieces O and P.

2. Adding the right and left handed screw H, working the nuts I and K backward and forward, and elevating and depressing the tappets E and F.

FRANCIS B. STEVENS.

Witnesses:
CORNELIUS CREEDON,
JULIUS HORNIG.